United States Patent

Andres

[15] 3,697,943
[45] Oct. 10, 1972

[54] INSTALLATION FOR INDICATING THE CLOSING CONDITION OF VEHICLE DOORS, ESPECIALLY OF MOTOR VEHICLE DOORS

[72] Inventor: Rudolf Andres, Sindelfingen, Germany

[73] Assignee: Daimler-Benz Aktiengesellschaft, Stuttgart-Unterturkheim, Germany

[22] Filed: Dec. 11, 1969

[21] Appl. No.: 884,129

[30] Foreign Application Priority Data

Dec. 12, 1968 Germany..........P 18 14 233.1

[52] U.S. Cl...................340/52 D, 180/111, 340/274
[51] Int. Cl. ..............................................B60q 1/00
[58] Field of Search..............340/52 D, 274; 180/111

[56] References Cited

UNITED STATES PATENTS

| | | |
|---|---|---|
| 2,722,673 | 11/1955 | Turner....................340/52 D |
| 1,479,062 | 1/1924 | Gottschalk................180/111 |
| 2,167,675 | 8/1939 | Palmer......................180/111 |
| 1,311,019 | 7/1919 | Smith........................200/159 |
| 3,455,410 | 7/1969 | Wilson......................180/111 |

*Primary Examiner*—John W. Caldwell
*Assistant Examiner*—Glen R. Swann, III
*Attorney*—Craig, Antonelli and Hill

[57] ABSTRACT

An installation for indicating the closing condition of vehicle doors, especially of motor vehicle doors, in which lines are provided that are connected to a vacuum source and terminate within the area of the doors; the lines are in communication with the atmosphere in case a door is not completely closed but are closed with respect to the atmosphere in case all doors are completely closed; a warning device is provided which in turn is actuated by the pressure in the lines.

12 Claims, 2 Drawing Figures

CLOSE DOORS

INVENTOR
RUDOLF ANDRES

BY *Craig, [Antonelli, Stewart & Hill]*

ATTORNEYS

3,697,943

INSTALLATION FOR INDICATING THE CLOSING CONDITION OF VEHICLE DOORS, ESPECIALLY OF MOTOR VEHICLE DOORS

BACKGROUND OF THE INVENTION

1. Field of the Invention

The present invention relates to an installation for the indication of the closing condition of vehicle doors, especially of motor vehicle doors.

2. Description of the Prior Art

The door locks of many motor vehicles include a main catch and a safety catch. Is is thereby not always possible without further ado for the driver of a motor vehicle to determine from his seat whether all doors are completely shut. Frequently, a door, for example, engaged only in the safety catch of the lock is noticed only after driving over a longer distance, for example, as a result of rattle noises.

The present invention is therefore concerned with the task to avoid this disadvantage and to give to the driver of the vehicle the possibility prior to starting a drive to control from his seat the closing condition of all doors of the vehicle.

Accordingly, an installation for the indication of the closing condition of vehicle doors, especially of motor vehicle doors, is proposed in accordance with the present invention in which lines connected to a vacuum source and terminating within the area of the doors are provided which are in communication with the atmosphere with not completely closed doors and which are closed off against the atmosphere with completely closed doors, and whereby a warning installation is provided actuated in dependence on the pressure in the lines.

Advantageously the lines are provided thereby with at least one throttle place and with at least one check-valve.

The suction pipe of an internal combustion engine thereby serves preferably as vacuum source.

The actuation of the warning installation takes place preferably by a vacuum-responsive switch which operates against the force of a spring and actuates, for example, an electric switch.

In a particularly advantageous type of construction of the present invention the closing of the lines connected to the vacuum source takes place by the rubber seals of the doors.

SUMMARY OF THE INVENTION

Accordingly, it is an object of the present invention to provide an installation for indicating the closing condition of vehicle doors which avoids by simple means the aforementioned shortcomings encountered in the prior art.

Another object of the present invention resides in an installation for the indication of the closing condition of motor vehicle doors which can be readily monitored from the driver's seat and is simple in construction as well as easy to install.

A further object of the present invention resides in an installation for indicating the closing condition of vehicle doors which utilizes relatively few parts, is reliable in operation and entails the advantage of completely reliable monitoring by the driver.

These and further objects, features and advantages of the present invention will become more obvious from the following description when taken in connection with the accompanying drawings which shows, for purposes of illustration only, one embodiment in accordance with the present invention, and wherein

DESCRIPTION OF THE PREFERRED EMBODIMENT

Figure 1:
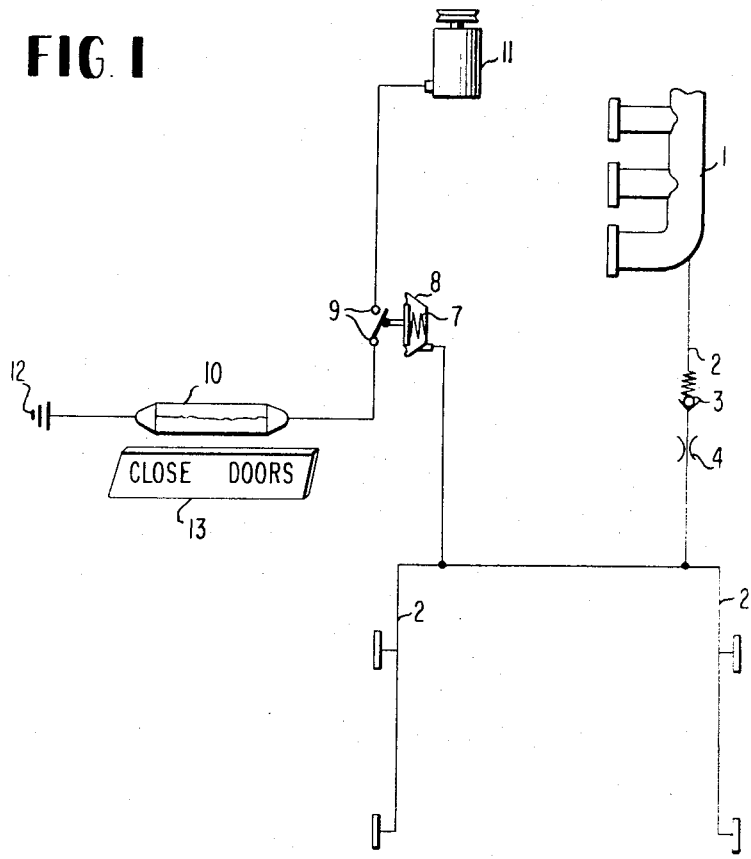
FIG. 1 is a schematic view of the overall installation in accordance with the present invention for a four-door motor vehicle.
Figure 2:
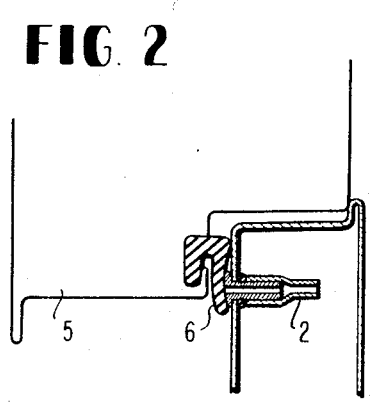
FIG. 2 is a partial, somewhat schematic cross-sectional view, on an enlarged scale, through a line of the indicating system which according to the present invention, is sealed by the rubber seal of a closed door.

Referring now to the drawing wherein like reference numerals are used throughout the two views to designate like parts, reference numeral 1 designates in FIG. 1 the suction pipe of a conventional internal combustion engine (not shown) to which is connected the line 2 of the vehicle. The line 2 leads by way of a check valve 3 and a throttling place 4 with branchings to the individual doors 5. At the door-side ends of the line 2, external or atmospheric air can be sucked-in with an opened or only partially closed door 5. If all doors 5 are closed completely, then the door-side ends of the line 2 are closed off by the rubber seals 6 of the doors 5. If the door-side ends of the line 2 are closed, then the vacuum of the operating internal combustion engine acts on a vacuum-operated switch 8 operating against the force of a spring 7, which then keeps open an electric switch 9. However, if one of the doors 5 is not fully closed, then the influence of the sucked-in atmospheric air predominates by reason of the throttled place 4 and therewith the force of the spring 7, i.e., the adjusting motor 8 connects the contacts of the switch 9. As a result thereof, an incandescent or glow lamp 10 lights up because the current circuit leading from the generator or alternator 11 to the vehicle ground 12 is closed thereby. For example, a transparent screen 13 or the like with the inscription "close doors" may be illuminated by the lamp 10. The current tap takes place at the generator or alternator 11 in order that the transparent screen 13 lights up only with a running internal combustion engine and not already with a turned-on ignition.

While I have shown and described only one embodiment in accordance with the present invention, it is obvious that the same is not limited thereto but is susceptible of numerous changes and modifications as known to those skilled in the art. For example, instead of an optical signal also an accoustic signal may be triggered off in a conventional manner by the warning installation in accordance with the present invention. Consequently, I do not wish to be limited to the details shown and described herein but intend to cover all such changes and modifications as are within the scope of those skilled in the art.

What is claimed is:

1. An installation for indicating the closing condition of vehicle doors, characterized in that line means are provided which are connected to a vacuum source and which terminate within the area of the doors, in that said line means are in communication with the atmosphere with a non-completely closed door and are closed off with respect to the atmosphere with completely closed doors, and in that a warning means is provided actuated in dependence on the pressure in said line means, and wherein said line means are provided with at least one throttle valve means in series with at least one check valve means disposed between said vacuum source and said doors.

2. An installation according to claim 1, characterized in that said line means terminate within the area of motor vehicle doors.

3. An installation according to claim 1, characterized in that the suction pipe of an internal combustion engine serves as a vacuum source.

4. An installation according to claim 3, further comprising a vacuum-responsive switch operating against the force of a spring and responsive to the vacuum in said line means for actuating said warning means.

5. An installation according to claim 4, further comprising rubber seal means against which the ends of the line means terminate at the location where the end of the door-side closes.

6. An installation according to claim 1, further comprising a vacuum responsive switch operating against the force of a spring and responsive to the vacuum in said line means for actuating said warning means.

7. An installation with a rotating machinery producing electric power according to claim 6, characterized in that said electric switch is in a circuit directly connected to said rotating machinery.

8. An installation according to claim 1, further comprising rubber seal means against which the ends of the line means terminate at the location where the end of the door-side closes.

9. An apparatus for indicating the closing condition of vehicle doors, comprising:

first means having a passage therethrough for conducting a fluid therethrough;

second means disposed at each respective location where each door is normally closed, for preventing the entry of fluid from the atmosphere into said first means when each respective door is closed;

third means, connected to said first means for imparting thereto a pressure negative with respect to the atmosphere external to said door; and fourth means, coupled to said first means and responsive to the pressure therein for generating a warning signal representative of the incomplete closure of one of said doors, and wherein said first means comprises a fluid conducting line connected with each door and wherein said second means comprises a rubber seal installed at each door at the location where the fluid line terminates with respect to each door to close the ends of the line when the door is closed.

10. An apparatus according to claim 9, wherein said fourth means comprises an electric switch, an indicator and a source of power for energizing said indicator connected in series, said switch further including vacuum-responsive switch means and spring mechanism for normally maintaining said switch open in response to the pressure in said lines corresponding to the closure in each of said doors.

11. An apparatus according to claim 10, wherein said third means comprises a check valve and throttle valve connected in series between the suction pipe of an internal combustion engine and said conducting line.

12. An apparatus according to claim 10, wherein the fluid conductive line for each respective door is connected in parallel to said vacuum-responsive switch means.

* * * * *